Patented Jan. 1, 1946

2,391,986

UNITED STATES PATENT OFFICE 2,391,986

PROTECTIVE SHEET FOR RUBBER

Lloyd Lyn Leach, Swarthmore, Pa., assignor to E. I. du Pont de Nemours & Company, Wilmington, Del., a corporation of Delaware No Drawing. Application November 17, 1942, Serial No. 465,909

3 Claims. (Cl. 154—50)

This invention relates to the protection of sheet materials having tacky or sticky surfaces. More particularly, this invention relates to a method and means for preserving the surface and chemical characteristics of unvulcanized rubber sheets, and for preventing such sheets from sticking together during the handling, storage, or shipping of the same.

At some stage in virtually every manufacturing process for fabricating rubber or rubberized products, it becomes necessary to handle, store or transport sheets or rolls of fresh unvulcanized rubber composition which must be protected from the deteriorating influence of oxidizing atmosphere and the like, and which must, in addition, be so protected that the tacky surface thereof will not be impaired or cause undesirable sticking. For this purpose protective separating and/or lining sheets of various materials including principally holland cloth, coated papers, glassine paper, fabric coated with regenerated cellulose, cellulose nitrate and similar coating materials, have been employed with some success. However, all of these materials suffer from one or more serious defects. For example, the glaze from holland cloth oftentimes remains on the raw rubber; also, the cloth is not gas-proof and after long standing the rubber becomes oxidized to some extent. Both of these factors operate to reduce the tackiness and hence the quality of the rubber. Paper and glassine paper tear very easily and are difficult to remove. The coating of regenerated cellulose-coated materials and the like tends to separate from the base and to adhere to the surface of the rubber. Many of the materials are not sufficiently heat-resistant to permit heat calendering of superimposed rubber sheets and still others adhere too tenaciously and are not easily removed from the rubber. For these reasons there has been a need, and hence a continuing search, for an inexpensive material free of all of the difficulties heretofore encountered.

It is, therefore, an object of the present invention to provide a protective coating for unvulcanized rubber which is gas-proof, tear-resistant, transparent or opaque as desired, which leaves no particles on the raw rubber surface after being removed therefrom, which does not adhere too tenaciously, and which can be reused or recovered.

A further object is to provide a self-sustaining protective separating or lining film of homogeneous material which can be easily handled under all normal climatic conditions and which, though it adheres closely to the surface of the rubber, can be readily removed and reused.

These and other objects will more clearly appear hereinafter.

The above objects are accomplished by this invention which comprises the employment of self-sustaining film of a plasticized water-soluble polyvinyl alcohol as a protective covering for raw unvulcanized rubber.

Polyvinyl alcohol substantially identical with that produced by the hydrolysis of polyvinyl acetate to convert at least 95% of the acetyl groups to hydroxyl groups, is preferred. Polyvinyl alcohol containing 65% or more hydroxyl groups may be used. Water-soluble partially acetalized polyvinyl alcohol such as water-soluble butyralated polyvinyl alcohol is also useful for the purposes of this invention.

The term "polyvinyl alcohol" as used throughout the specification and claims, unless otherwise limited, is intended to include water-soluble polyvinyl hydroxyl compounds and their water-soluble derivatives.

The polyvinyl alcohol from which the film is made should have a molecular weight of between 10,000 and 22,000 and preferably the molecular weight should be between 15,000 and 19,000.

The film cast from the above described polyvinyl alcohol should contain a material which softens or plasticizes the film in order to impart the proper softness, flexibility and toughness. Thus, a plasticizer such as glycerin, the alkylolamides (e. g. ethanol formamide and ethanol acetamide) disclosed in Watkins U. S. Patent No. 2,250,664, or the beta hydroxy alkyl ammonium salts disclosed in Watkins U. S. Patent No. 2,271,468 may be incorporated in the film-forming composition or otherwise incorporated into the film. The plasticizer should be present in an amount from 5% to 50% based on the weight of the dry (solvent-free and water-free) polyvinyl alcohol in the film, and preferably the plasticizer should be present within the range of 10% to 25% based on the weight of the dry polyvinyl alcohol present in the film. Unplasticized film, however, may be used successfully in an atmosphere of high relative humidity since the film absorbs moisture from the highly humid air and is plasticized by the absorbed moisture. When water alone is used as a plasticizer for the film, the water content should be within the range of 6% to 25% based on the weight of the dry polyvinyl alcohol in the film.

The polyvinyl alcohol sheets or films may be prepared in any of the conventional ways, for example, by evaporative (dry) casting (as disclosed in Izard U. S. Patent No. 2,176,903), by coagulation (wet) casting (as disclosed in Izard et al. U. S. Patent No. 2,236,061), or by any other suitable method. Sheet material especially adapted for use in the present invention can be produced by casting an aqueous polyvinyl alcohol solution onto a smooth metal surface and drying.

A film suitable for use in accordance with the present invention should be of sufficient thickness to be self-supporting and possess the desired toughness and tear-resistance. Films having a thickness of 0.001 to 0.01 inch may be used. However, it is preferred that the film have a thickness of from 0.002 to 0.005 inch.

The polyvinyl alcohol film is applied to the raw rubber in the same manner as other protective coverings are applied. For example, in applying the protective covering to camel-back and retread materials, the polyvinyl alcohol film is unwound from a roll and applied continuously to the camel-back material as it comes out of the extrusion machine, or it may be applied at any time before the camel-back is rolled up.

The following specific example will further serve to illustrate the present invention.

Example

Polyvinyl alcohol film containing 15% by weight of glycerin (based on the water-free weight of the polyvinyl alcohol of the film) and having a thickness of 0.002 inch is prepared, by dry casting, from polyvinyl alcohol produced by saponifying polyvinyl acetate down to 1% acetyl content, the resulting saponified compound having a molecular weight of 18,000. A sheet of this film is applied to raw uncured rubber in the form of camel-back at the time the rubber comes out of the extrusion machine. The resulting product is then cooled and rolled up and ready for use. Although the raw rubber stock is kept for considerable periods of time before being used, the polyvinyl alcohol film may be easily stripped therefrom leaving no particles of film on the raw rubber surface. The raw rubber surface is substantially in the same condition as when the protective cover was applied.

The films or sheets used in the present invention in order to reduce their water-sensitivity may, if desired, be coated on one side only with a moistureproofing coating composition. The coated surface, however, shall not be in contact with the rubber surface. The film may also be surface-treated with an aldehyde or other materials to reduce its water-sensitivity. This treatment should also be carried out on one surface only, and this surface should not come in contact with the uncured rubber surface.

By the use of the film of the present invention, the raw uncured rubber is maintained in substantially unchanged state while the protective covering is in place. The covering is substantially gas-proof and, therefore, oxygen cannot readily gain access to the raw rubber surface. The film, which is tough and tear-resistant, conforms well to the rubber surface and on being removed therefrom leaves no particles thereon. The film may be used in a transparent and colorless form if desired, or it can be readily dyed or opacified by the incorporation therein of suitable dyes or pigments. The film is easily handled under all climatic conditions at which uncured rubber can be handled. The film may be reused since its surface is not disturbed when it is stripped from the raw rubber surface. The film may also be readily recovered by dissolving and recasting in view of its water-solubility. By this property, the cost of its use can be considerably reduced.

The film of the present invention is used particularly advantageously as a liner in the tire-building operation because of its transparency which permits the operator to easily place the plied layers in alignment.

Other materials on which the polyvinyl alcohol film may be used are cushion stock, which is a thin rubber layer placed between the cord fabric and tread in the manufacture of a tire, and rubber repair materials generally, for example, tire patches.

The material to be protected from deterioration has been described above as unvulcanized rubber sheets. It is intended that this term include in addition to raw, natural rubber; the vulcanizable, synthetic rubber such as Neoprene; processed, reclaimed rubbers which are vulcanizable; and any other rubber materials which require such protection.

Since it is obvious that many changes and modifications can be made in the details described above without departing from the nature and spirit of the invention, it is to be understood that the invention is not to be limited to said details except as set forth in the appended claims.

I claim:

1. An article of manufacture comprising a sheet of rubber having a tacky surface and a protective covering comprising a self-sustaining plasticized preformed film of a water-soluble polyvinyl alcohol substantially identical with that formed by the hydrolysis of at least 95% of the acetyl groups of polyvinyl acetate, closely adhering to said surface, said polyvinyl alcohol having a molecular weight of from 15,000 to 19,000, and said film having from 5% to 50% by weight of a plasticizer for the polyvinyl alcohol.

2. An article of manufacture comprising a sheet of rubber having a tacky surface and a protective covering comprising a self-sustaining plasticized preformed film of a water-soluble polyvinyl alcohol substantially identical with that formed by the hydrolysis of at least 95% of the acetyl groups of polyvinyl acetate, closely adhering to said surface, said polyvinyl alcohol having a molecular weight of from 15,000 to 19,000, and said film having from 10% to 25% by weight of a plasticizer for the polyvinyl alcohol.

3. An article of manufacture comprising a sheet of rubber having a protective covering comprising a preformed film, between 0.001 and 0.01 inch thick, of a polyvinyl alcohol substantially identical with that formed by the hydrolysis of at least 95% of the acetyl groups of polyvinyl acetate, closely adhering to said surface, said polyvinyl alcohol having a molecular weight of from 15,000 to 19,000, and said film having from 10% to 25% by weight of a plasticizer for the polyvinyl alcohol.

LLOYD LYN LEACH.